June 26, 1962      R. C. CARLSON      3,040,599

POWER TRANSMISSION MECHANISMS

Filed Feb. 2, 1960      4 Sheets-Sheet 1

INVENTOR.
Reuben C. Carlson
BY
John L. Wiegreffe
ATTY.

June 26, 1962    R. C. CARLSON    3,040,599
POWER TRANSMISSION MECHANISMS
Filed Feb. 2, 1960    4 Sheets-Sheet 2

INVENTOR.
Reuben C. Carlson
BY
ATTY.

June 26, 1962
R. C. CARLSON
3,040,599
POWER TRANSMISSION MECHANISMS
Filed Feb. 2, 1960
4 Sheets-Sheet 3
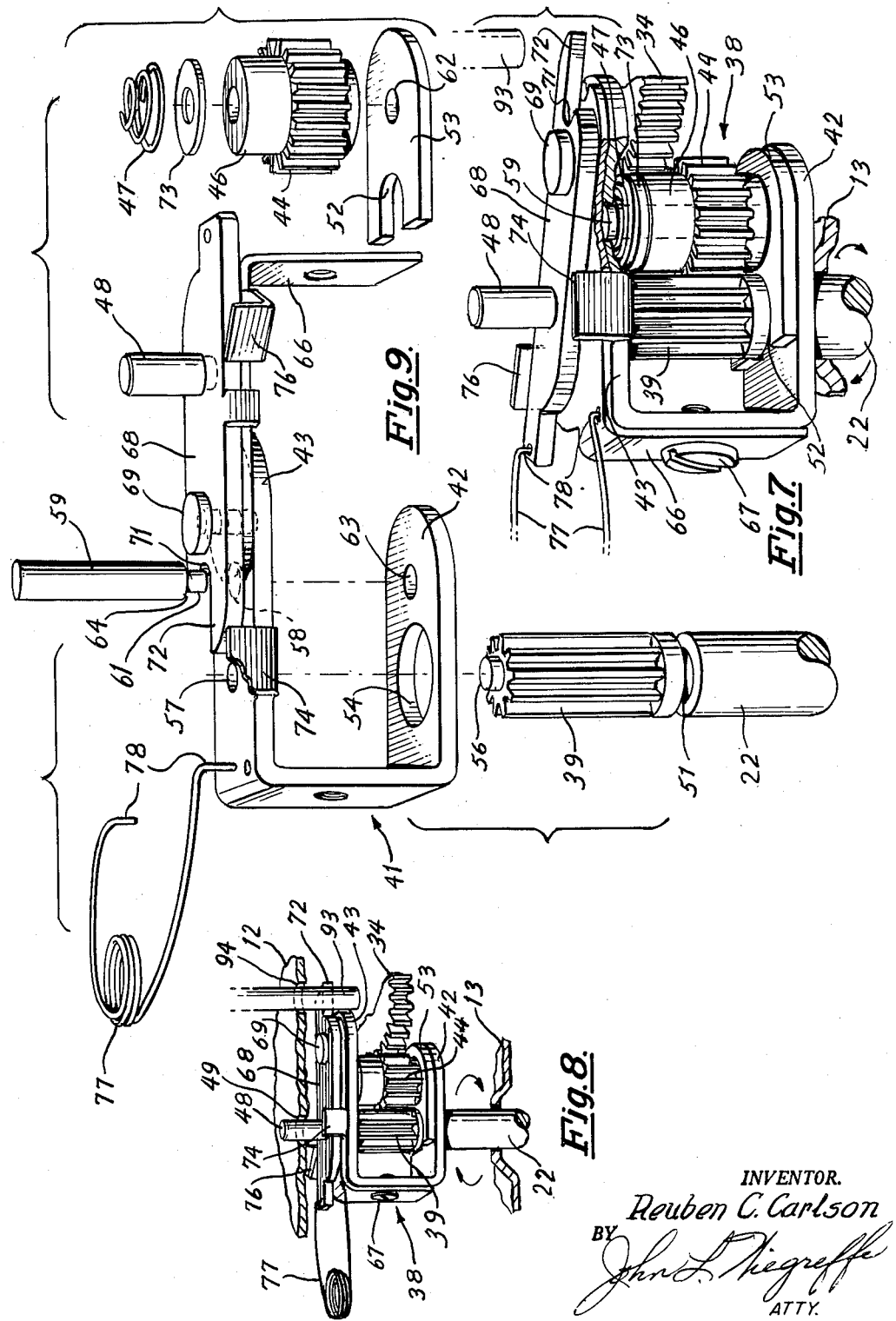
INVENTOR.
Reuben C. Carlson
BY
ATTY.

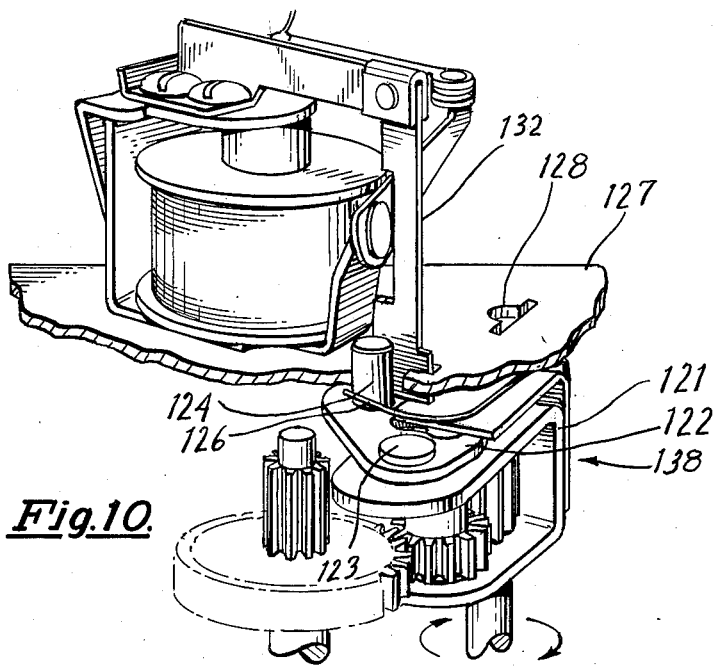
Fig.10.
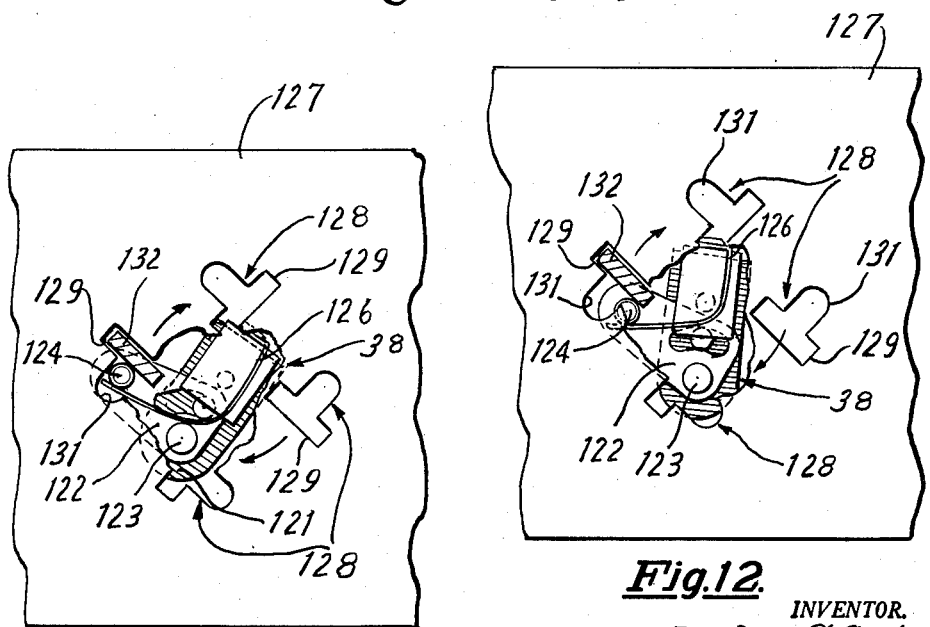
Fig.11.
Fig.12.
INVENTOR.
Reuben C. Carlson
BY
John L. Wiegriff
ATTY.

United States Patent Office 3,040,599
Patented June 26, 1962

3,040,599
POWER TRANSMISSION MECHANISMS
Reuben C. Carlson, Bensenville, Ill., assignor to Admiral Corporation, Chicago, Ill., a corporation of Delaware
Filed Feb. 2, 1960, Ser. No. 6,177
10 Claims. (Cl. 74—665)

This invention relates to power transmission mechanism and particularly to an improved mechanism for selectively connecting a unidirectional driving member to any one of a plurality of driven members for turning them in either direction. An embodiment of the invention is illustrated in connection with a plurality of rotary controls on a television receiving apparatus, any one of the controls being selectively rotated in either direction from a drive member rotating in a single direction.

Although it is not new to manipulate the tuner of a television receiver by an electric motor the operation of which is responsive to remote control, the apparatus of the prior art by using either a reversible motor or a unidirectionally rotating motor for this operation left much to be desired. In the case of a reversible motor, additional apparatus and controls had to be employed to properly operate the television receiver controls. The additional apparatus represented an expense which had to be considered with the cost of the motor which was per se considerably higher than the cost of a unidirectional motor. The outstanding disadvantage of the unidirectionally rotating motor drive was that the rotary tuner control could not be turned backward by the motor and if the rotary control was turned slightly past a predetermined point it was possible to then move the control to the predetermined point only by turning the control in the same direction through nearly a full turn. This was time-consuming and an annoyance to an operator of the television receiver. Also in these prior devices, regardless of the type of motor used for operating the rotary mechanism of a tuner, additional actuating means was necessary for operating the volume control.

In accordance with the present invention a plurality of controls, on a television receiver, including the tuner and/or volume control may be turned, selectively in either direction, by a unidirectional motor. The motor may be remotely controlled and used to turn both controls, alternately in either direction. Furthermore, either of the controls may be so turned through differing increments of movement.

One object of the present invention is to provide an improved mechanism of the type described above which will at the same time be capable of providing a maximum of outputs and be simple and inexpensive.

Another object is provision of novel mechanism by which the volume control and/or the tuner of a television receiver may be turned in either direction by a unidirectional motor.

Another object is to simplify control of television apparatus by eliminating the need for costly circuit components called for by use of a reversible motor, manufacturing cost being thereby reduced.

Other advantages of the invention will be apparent from the accompanying description when considered in connection with the drawings, in which:

FIG. 7 is a fragmentary perspective view of the planetary couple and part of the latch mechanism;

FIG. 8 is a fragmentary perspective view corresponding to FIG. 7, parts being shown in a different position;

FIG. 9 is an exploded view of parts shown in FIG. 6;

FIG. 10 is a fragmentary perspective view of a second embodiment of the invention;

FIG. 11 is a fragmentary top plan view thereof, drawn to an enlarged scale, the relays having been removed; and FIG. 12 is a view corresponding to FIG. 11, parts being shown in a different position.

Figure 1:
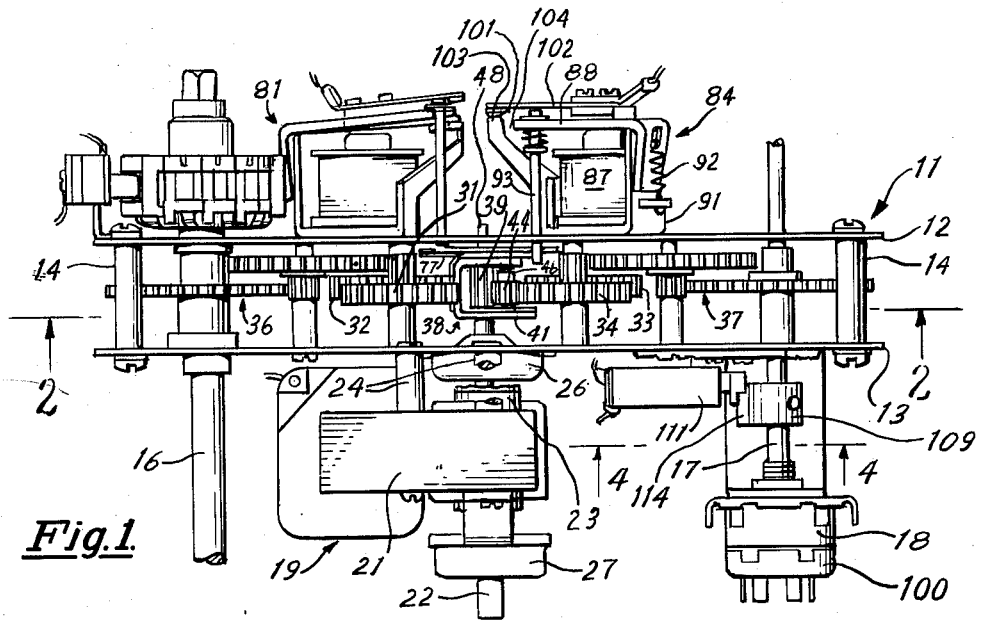
FIG. 1 is a top plan view of apparatus, embodying the invention, parts thereof being broken away.

Throughout the drawings the reference character 11 is used to denote a composite frame formed by a pair of rectangular metal plates 12 and 13 in spaced relation to each other by posts 14 one of which is fixed to each of the corners of the plates. The frame receives, adjacent one of its ends, a shaft 16 extending from a television tuner, not shown, while adjacent its opposite end the frame affords support for a volume control 18, bracketed to the plate 13 and having a shaft 17 passing freely therethrough. Both of the shafts 16 and 17 may be alternately turned in either direction by a control motor 19 also supported from the frame 11.

Before describing the alternate driving connections between the motor and the shafts 16 and 17 it is timely to first point out some of the characteristics of the motor 19. Primarily, it is of the unidirectional class; that is, it is capable of rotating in one direction only. It includes a stator 21, FIG. 5, a shaft 22 and a rotor 23 fixed to the shaft. The motor 19 is spaced from the frame 11 by a plurality of posts 24, FIG. 1, bolted to the stator 21 and plate 13. The shaft 22, of the motor, is mounted to slide axially within a bearing 26, on the plate 13, and a bearing 27, fixed to the stator 21 for a purpose later to be apparent. The rotor 23 is arranged to occupy a position in axially offset relation to the stator 21 when the motor is not running. This is a normal position for the rotor and is yieldably maintained by a compression spring 28, FIG. 6, coiled about the motor shaft 22 and confined between the rotor 23 and bearing 26. When operation of the motor is initiated, the rotor 23, of course, turns the shaft and early in its rotary motion the shaft is moved axially into greater proximity to the frame, or toward a predetermined point within the frame, the axial motion being due to the attraction of the stator on the rotor to draw the latter into the former, against the resistance of spring 28. The distance that the shaft may be thus moved axially is limited by latch mechanism later to be described. When operation of the motor is discontinued, the spring 28 returns the rotor to its normal offset relation to the stator 21.

Figure 2:
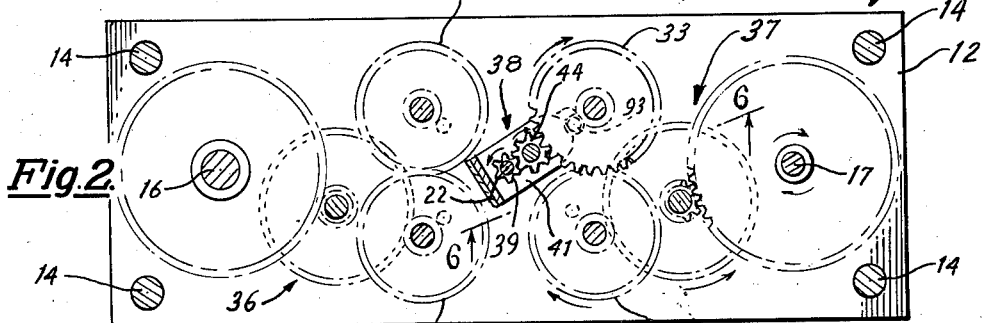
FIG. 2 is a vertical section taken on the line 2—2 of FIG. 1.
Figure 3:
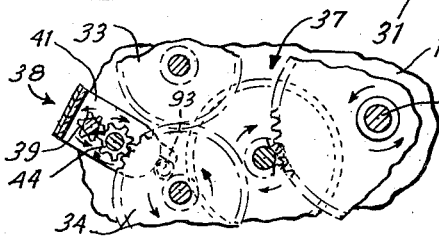
FIG. 3 is a fragmentary view corresponding to FIG. 2, parts being shown in a different position.

For the shafts 16 and 17 to be alternately driven by the motor 19 a series of drivable gears 31, 32, 33 and 34, FIG. 2, are rotatably supported in a common plane, between and by the plates 12 and 13 and radially equidistant from the motor shaft 22.

The gear 31 constantly meshes with the gear 32 and both are members of a first gear train 36 drivingly coupled to the shaft 16. Therefore the gears 31 and 32 turn in opposite directions when either of them is turned. Consequently the shaft 16 may be turned alternately in opposite directions by alternately turning the gears 31 and 32 in the same direction. A second gear train 37 includes the gears 33 and 34. They are in constant mesh and are drivingly coupled to the shaft 17 by the gear train 37 so that alternate rotation of the gears 33 and 34, in a common direction, results in turning of the shaft 17 alternately in opposite directions. Both of the gear trains are spaced from each other and are operable by means now to be described.

Figures 6, 13:
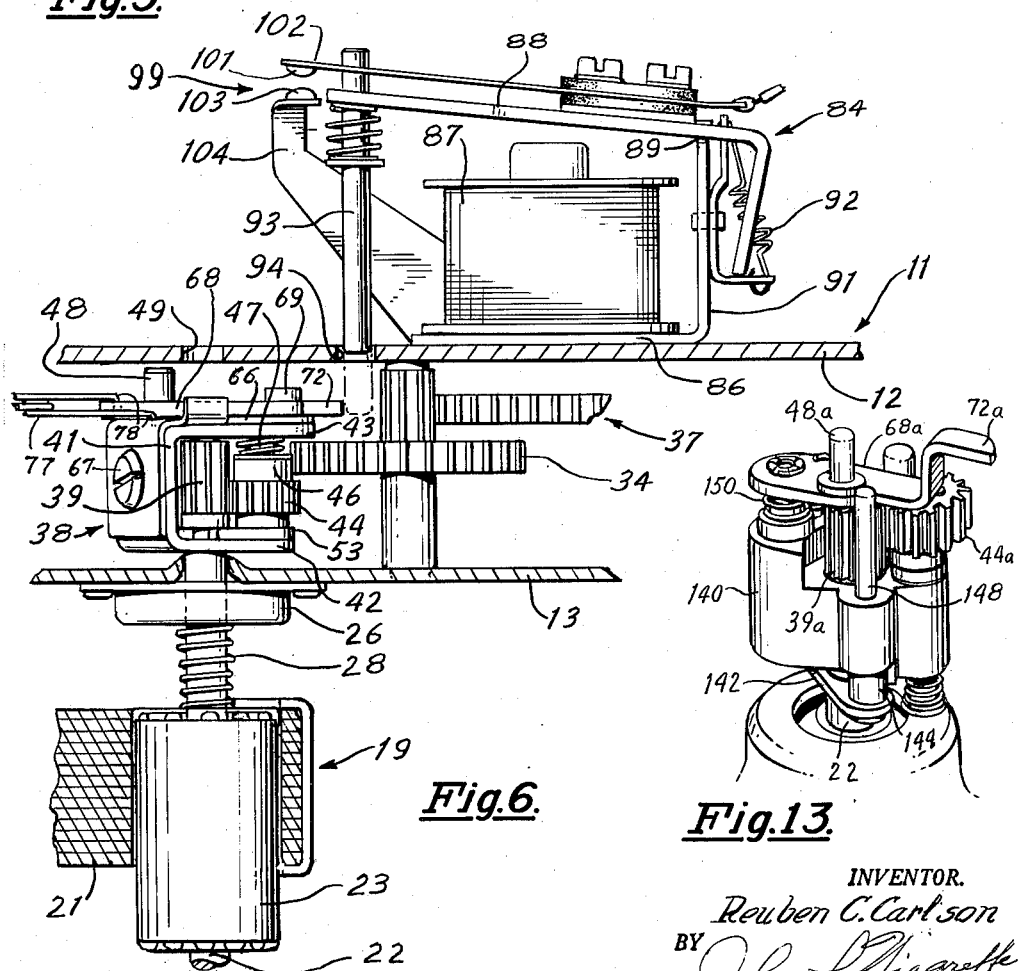
FIG. 6 is a fragmentary section taken on line 6—6 of FIG. 2 and drawn to an enlarged scale.
FIG. 13 is a fragmentary perspective view of a modification of the planetary couple of FIG. 7.

For severally driving the gears 31, 32, 33 and 34, a planetary gear couple 38, FIG. 6, is provided on the end of shaft 22. The couple 38 includes a pinion 39, fixed to the shaft 22, and a U-shaped yoke or gear carrier 41, journaled on the shaft, to embrace opposed ends of the pinion. The yoke 41 therefore includes parallel arm portions 32 and 43, FIG. 9, between which and by which a selector gear, planetary gear or orbital gear 44 is rotatably supported in mesh with the pinion 39. While the teeth of pinion 39 extend for the greater part of the space between the arms 42 and 43, the orbital gear 44 has teeth for about half the length of the pinion. The orbital gear also has a hub 46 between which and the arm 43 a compression spring 47 is confined to bias the gear 44 toward the arm 42 and retain the gear teeth out of the plane of the gears 31, 32, 33 and 34 when the motor 19 is not operating. Although the gear carrier 41 is arranged to turn on the shaft 22, as indicated, there is sufficient friction, by means later to be indicated, between the shaft and gear carrier for the latter to be rotated with the shaft when operation of the motor is initiated. During the initial rotations of the shaft 22 the gear 44 is, of course, carried in an orbit about the shaft 22, there being no turning motion of the orbital gear relative to the pinion although the pinion and orbital gear remain in mesh.

As previously stated, the rotor 23 is moved axially into the stator as the rotor starts turning. The extent to which the rotor may be so moved is limited, however, by latch mechanism of which the plate 12 plays the role of a fixed member while a latch pin 48 plays the role of a movable latch member. The plate 12 has a bore 49 therein which is concentric with the axis of the shaft 22, and the pin 48 is normally eccentric to the bore 49 by its support indirectly from the carrier 41, as will later be apparent. Consequently the urge of the pin 48 to move axially is effectively resisted by frictional engagement of the extremity of the pin with the plate 12 at an arc about the axis of bore 49. The gear 44 is thus latchably precluded from movement into the plane of the drivable gears 31, 32, 33 and 34. The pin 48 is mounted for movement into a state of concentricity with the bore 49, which is formed to receive the pin, for an unlatched relationship to be established between the planetary couple and plate 12 when the planetary couple may move to a predetermined point at which the gear 44 is coplanar with the gears 31, 32, 33 and 34.

In order to fully understand the operation of the latch means it is timely to first consider its structure and mode of combination with the planetary couple 38. Therefore reference should be made to FIGS. 7–9 inclusive. Therein it will be noted that the shaft 22 is formed with an annular groove 51 formed to receive a bifurcated end 52 of a lock member 53. The shaft 22 is passed through a hole 54 in the arm 42 and is formed with a coaxial pintle 56 received in a bore 57 in the arm 43. The shaft is retained against axial displacement relative to the gear carrier by the member 53 the end 52 of which is retained in the groove 51 as follows: The arm 43 has a hole 58 adjacent the hole 57 to receive a pin 59 as a bearing for the orbital gear 44 between which and the arm 42 the lock member 53 is sandwiched, its end 52 embracing the shaft in the groove 51. For the member 53 to be retained in the groove 51 one of the ends of the pin 59 is of reduced diameter at 61 to pass through a hole 62 in the member 53 and into a hole 63 in the arm 42. While the pin 59 is precluded from axial displacement, toward the motor, by engagement of a shoulder 64 provided by the reduced diametral section 61 with the member 53, displacement of the pin in the opposite direction is precluded by a confining member 66, preferably formed from sheet metal which is thinner and more wear resistant than the carrier 41. Desirably the member 66 may be formed from spring stock and is secured by a screw 67 to the gear carrier 41. The member 66 is L-shaped to overlie the end of the pin 59, and be sandwiched between the arm 43 and a latch arm 68 pivotally coupled to the arm 43 by a rivet 69, the rivet also passing through the spring 66. Since the latch member 48 is fixed to the arm 68, it will now be apparent how it is indirectly supported from the carrier 41.

In assembling the parts associated with the planetary couple 38, the confining member 66, its ends reversed relative to the position in which it is shown in FIG. 8, is superimposed by the latch arm 68 in the position the latter is shown. The rivet 69 is then passed through the latch arm 68, member 66 and arm 43 and upset inwardly of the latter. That end of the latch lever overlying the arm 43 is notched at 71 in order that, in the position thereof just indicated, it may not cover the bore 58, and have a finger 72 for a purpose later to be apparent. Then the orbital gear 44 and spring 47 are operatively arranged between the arms 42 and 43 and the pin 59 having been passed through the arm 43 is also passed through the spring 47 and part of the way through the gear 44. If desired, a washer 73 may also be used on the pin between the spring and hub 46. The pinion 39 is then inserted in the carrier 41, by way of the aperture 54, until the groove 51 is inside the carrier 41. Then the lock member 53 is inserted between the gear 44 and arm 42 until the bifurcated portion 52 is received in the groove 51. The next step is to pass the pin 59 farther through the gear 44 until its section 61 is received in the holes 62 and 63. When the pin 59 is so arranged its extremity, opposite the section 61, is flush with the outside of the arm 43 so that the member 66 and arm 68 may be swung about the rivet 69 and over the pin to preclude displacement of the latter from the carrier 41. After the member 66 is swung to the position shown in FIG. 7, it is additionally secured to the carrier by the screw 67. The latch arm 68, however, is free to swing about the rivet 69 within predetermined limits provided by a first lateral ear or stop 74, on the arm 43, and a second stop 76, on the confining member 66. Normally, the latch arm 68 engages the ear 76 by force of a spring 77 having lateral end portions 78 passing through one of the ends of the arm 68 and through the member 66 and arm 43.

As long as the latch lever 68 is in its normal position, described, it is latched relative to the plate 12. It will not allow the orbital gear 44 to move into the plane of any of the gears 31, 32, 33 or 34 because the latch pin 48 is eccentric of the hole 49, although the latch pin is on an arc passing through the axis of the hole 49. It therefore follows that the pin 48 performs the role of a movable latch member which must be displaced, against resistance of the spring 77, until the pin is coaxial with the hole 49 for the latch mechanism to be unlatched, the plate 12 playing the role of a fixed latch member transversely of the axial course of the shaft 22.

In order to understand how the planetary couple 38 may be unlatched from the frame 11 it should be remembered that the finger 72 is carried through an orbit about the axis of the shaft 32 when operation of the motor is initiated and that the latch member 48 is concurrently biased to a position offset relative to the shaft by the spring 77 so that the member 48 may not enter the hole 49 so long as the latch arm 68 remains latched. Also during the initial turning motion of the shaft the stop 76 precedes the stop 74. It will therefore be evident that if an obstruction is introduced into the orbit of the finger 72 to engage it and thereby operatively resist its orbital motion that two other things take place. First, the latch pin 48 is immediately swung into coaxial relation to the hole 49, against force of the spring 77 thereby enabling the shaft 32, biased axially by energization of the motor, to carry the pin 48 into the hole 49 and consequently carry the orbital gear 44 into the plane of the drivable gears 31, 32, 33 and 34. The second thing that takes place, and it occurs substantially concurrent with the first, is that rotation of the gear carrier is halted since the latch arm 68 is swung far enough about the pivot 69 to be engaged by the stop 74. As the gear carrier 38 is thus brought to a standstill and orbiting of the gear 44 is consequently interrupted, rotation of the orbital gear about its own axis is initiated.

It will now be apparent that if the orbital motion of the gear 44 is arrested in greatest proximity to any selected one of the gears 31, 32, 33 and 34 that the gear 44 will be carried into driving communication with the selected gear when the planetary couple is unlatched from the frame 11.

Figure 5:
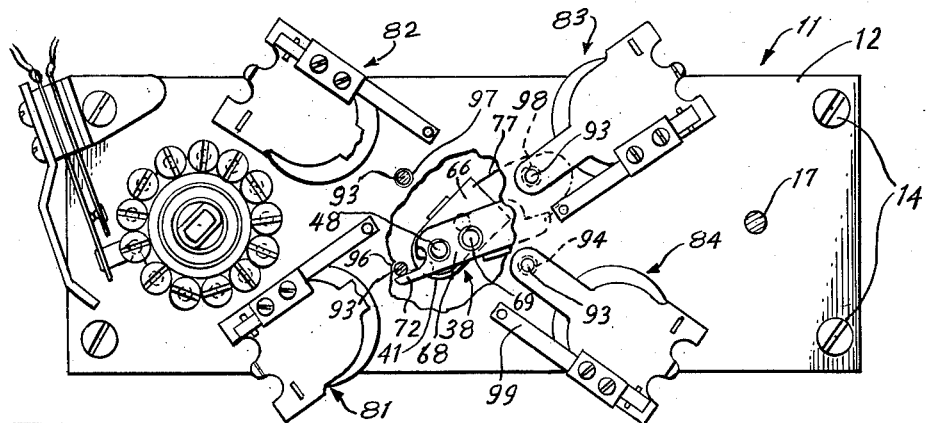
FIG. 5 is an elevational view of the apparatus shown in FIG. 2 as viewed from the opposite side thereof.

It therefore follows that suitable selector mechanism must be provided to stop the rotary motion of the carrier 41 in an angular position wherein the gear 44 is in greatest proximity to any selected one of the gears 31, 32, 33 and 34. Such apparatus is best shown in FIGS. 5 and 6 and includes a series of similar relays 81, 82, 83 and 84 each of which is arranged to control cooperation between the orbital gear and one of the drivable gears. Each of the relays has a metal base 86 rigidly secured to the plate 12, an electro magnet 87, on the base 86, an armature 88, tiltably supported at 89 on an arm 91 of the base and biased to an upward position for normally spaced relation to the magnet by a tension spring 92. Remote from its support, the armature is articulately coupled to the upper end of an unlatching member or selector 93, FIG. 6, the lower end of which is freely received in a bore 94 in the plate 12. The selector is thus positioned substantially perpendicular to the plate 12 and may be moved longitudinally thereof in this position. The relay 81 is similarly associated with a bore 96. Relay 82 is likewise associated with a bore 97 while the relay 83 is in association with a bore 98. Each of the bores 94, 96, 97 and 98 are on a single arc about the shaft 22. Each of the bores is therefore formed to receive a selector of one of the relays. And each of the relays, when energized, moves a different selector into the course through which the fingers 72 is swung to interrupt the orbital motion of the orbital gear 44 by engagement of a selected selector by the finger 72. As a result of the cooperation between one of the selectors and the finger 72, the latch member 48 is carried into coaxial relationship to the bore 49 thereby for the planetary couple 38 to be moved to its unlatched position previously described.

Each of the selector bores 94, 96, 97 and 98 is so arranged that the selector extendable through each stops the gear 44 beside a particular one of the drivable gears 31, 32, 33 or 34 as the case may be, and with unlatching of the gear couple 38 the orbital gear is carried axially into mesh with a selected drivable gear to carry out a tuner adjustment and/or an adjustment to the volume control 18.

Operation of the motor 19 is consequent to energization of one of the relays 81, 82, 83 or 84. This is in order that one of the selectors may be moved into position for engagement by the finger 72 as soon as the planetary couple is moved from its normal position, FIG. 6, to its latched position, wherein the member 48 frictionally engages the plate 12. Means responsible for this operation includes a switch 99. It comprises a switch contact 101, carried by the end of a resilient switch blade 102 and secured to the armature 88 from which the blade is insulated, and a contact 103, carried by a second arm 104 extending upwardly from the base 86. The switch 99 is in circuit with the motor 19, as is a plurality of switches 106, 107 and 108 each of which is in connection with one of the remaining relays. Each of the switches 99, 106, 107 and 108 is normally open but closable by their associated relays. This enables the relay to be energized by a current differing from the current used for operation of the motor.

Figure 4:
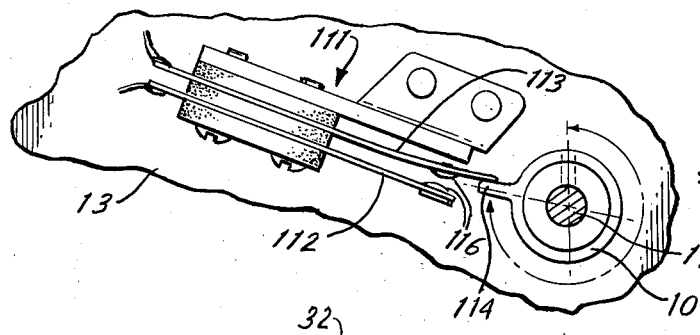
FIG. 4 is a fragmentary section, taken on line 4—4 of FIG. 1 and drawn to an enlarged scale.

Means is provided for stopping the motor 19 when the shaft 17 of the volume control has been turned to opposed predetermined limits. The means includes a crank member 109, FIGS. 1 and 4, on the shaft 17. The member 109 is associated with a switch 111 supported from the plate 13. The switch 111 is normally closed and in circuit with the motor and the volume control. The switch includes a pair of blades 112 and 113 the latter of which is longer than the former and arranged to be deflected away from the former by the member 109 when a crank arm 114 thereon is rotated far enough clockwise to move a pair of contacts 116 on the blades apart by engaging the end of blade 113. When the shaft 17 has turned adequately counterclockwise, another switch 100 in association with the volume control 18 and in circuit with the motor 19, is opened to stop the motor and allow the rotor thereof to be returned to its normal position. The purpose of the switch is, of course, to prevent breakage of the volume control when it has been turned beyond its maximum volume position.

In FIGS. 10, 11 and 12 is disclosed an alternative construction wherein a planetary couple 138 comprises a U-shaped carrier 121 to which a latch arm 122 is pivoted at one end thereof at 123. The remaining end of the arm carries a movable latch member 124 corresponding to the member 48 of the previously described construction. It is biased to a retracted position by a lateral deflection spring 126, relative to the carrier 121. In its normal position, the member 124 is arranged to orbit in an arc at a plate 127, corresponding to plate 12, within the arc of a plurality of apertures 128. Each of the apertures includes a selector or slot portion 129, which is narrower than the diameter of the pin 124, and an integral clearance portion 131 formed to slidably receive the latch pin 124. The latch pin 124 in passing through its orbit passes over one end of the slot portions 129 and within the arc of the clearance portions 131. The slot portions 129 are adapted to receive selectors 132 each of which is operable by one of a group of the relays 81–84. Each of the selectors 132 is flat and when inserted into the orbit of the latch pin 124 interrupts its orbiting and is arranged to cam the pin outward from its retracted position until the pin is over the clearance portion 131 through which said pin is thrust by longitudinally biased force of the motor shaft.

In FIG. 13 there is disclosed a modified construction of the planetary couple assembly of FIG. 7, wherein a unitary gear carrier 140 is longitudinally affixed to the shaft 22 but rotatably attached relative thereto by means of a plate 142 and pin mounts 144 (one of which is shown).

A pinion gear 39a, similar to pinion 39, affixed to the end of shaft 22, is journaled within the carrier 140 for rotary movement relative thereto. An orbital gear 44a, in mesh with pinion 39a, is journaled in the carrier 140 for relative rotatable movement therewith as a result of the energization of motor 19 and the unidirectional rotation of shaft 22.

A latch arm 68a, similar to arm 68, is mounted on a pin 146, rotatably journaled in the carrier 140. The arm 68a is biased towards a stop 148 by means of coil spring 150. The arm 68a has a finger 72a, similar to finger 72, for engagement with a selector, such as selector 93 of FIG. 6, to interrupt the rotation of the carrier 140, during a selected operation of the planetary couple and its associated apparatus. This latter action, similarly permitting the coaxial engagement of latch member 48a with the bore 49 as in the operation of the embodiment of FIG. 6.

While the invention has been shown and described in several embodiments thereof, I understand that extensive departures therefrom can be made without departing from the true spirit or scope thereof.

What is claimed is:

1. In a mechanism by which a plurality of rotary controls may be selectively turned in either direction, the combination, a drive shaft having a gear portion and being mounted for axial motion, a plurality of pairs of coplanar drivable gears, the gears of each pair being in mesh and each of said pairs being spaced on an arc about the axis of said shaft, a separate driving means between both of the gears of each of said pairs and one of said controls whereby alternate rotation of either of the gears of any of said pairs in the same direction may turn one of said controls in opposite directions, a planetary couple including a gear carrier and orbital gear mounted thereon, said gear being in mesh with said drive shaft gear portion, said gear carrier being mounted on said shaft for axial movement therewith and limited frictional rotation therewith, said shaft being biased axially away from the plane of said drivable gears for said orbital gear to be normally spaced from said drivable gears, a movable latch member pivoted to said gear carrier, first and second spaced stops on said gear carrier arranged to limit the swing of said movable latch member between latched and unlatched position, a spring connected to said movable latch for biasing it to latched position, a driving member fixed to said shaft for turning it in but one direction, and for urging it toward the plane of said drivable gears as its operation is initiated and for swinging said movable latch through a rotary course, a fixed latch member adapted to preclude entry of the orbital gear into the plane of said drivable gears by engagement of said fixed latch member by said movable latch member and a plurality of movable unlatching members each associated with a different one of said gears, each of said unlatching members being biased out of the course of said movable latch but arranged to be selectively and severally moved into said course to provide for movement of said movable latch member to its unlatched position by intercepting it at different points along said rotary course, said fixed latch member being formed to free said movable latch member whereby to permit axial movement of said orbital gear into engagement with a selected one of said drivable gears and to interrupt orbiting of said orbital gear to initiate rotation thereof, each of said drivable gears being arranged to severally mesh with said orbital gear at one of said different points whereby a selected control may be operated in a selected direction on operation of a selected unlatching member.

2. In a mechanism for selectively connecting a rotational driving member to any one of a plurality of rotational driven members, planetary coupling means operatively associated with said driving member, carrier means for mounting said planetary coupling means on said driving member, said carrier means being frictionally coupled to said driving member for limited rotatable movement therewith, said coupling means thereby being frictionally rotatable with said driving member to a selected position of operable connection with one of said plurality of driven members, latch means for selectively engaging said carrier means when said coupling means is in said selected position and preventing its further rotation with said driving member, said coupling member acting in said selected position to transmit rotational movement from said driving member to said driven member.

3. In a mechanism for selectively connecting a unidirectional driving member to any one of a plurality of driven members, said unidirectional driving member being rotatably and axially movable relative to a frame for supporting said mechanism, a planetary member drivably associated with said driving member and axially and rotatably movable therewith, selecting means for each of said plurality of driven members, each of said selecting means including latch means for selective engagement with said planetary member, said planetary member being held by said latch means during said engagement in a position of rotational driving association with one of said driven members.

4. In combination, a unidirectional rotational driving member, a planetary member rotationally coupled to said driving member and mounted for movement in an orbital path about the axis of said driving member, means for selectively interrupting said movement and maintaining said planetary member in any of a plurality of preselected positions on said path, said planetary member being adapted for rotation about a stationary axis during its maintenance in each of said preselected positions, and a corresponding plurality of utilization means each rotationally coupled to said planetary member when said planetary member is in a corresponding one of said positions.

5. In combination, a rotational driving member, a planetary member rotationally coupled to said driving member and mounted for movement in an orbital path about the axis of said driving member, means for selectively maintaining said planetary member in any of a plurality of preselected positions on said path, and a corresponding plurality of utilization means each rotationally coupled to said planetary member when said planetary member is in a corresponding one of said positions, said driving member and said planetary member being axially movable as a unit between first and second axial locations whereby said planetary member is couplable with said utilization means when in said second location, but not when in said first location.

6. In combination, a rotational driving member, a planetary member rotationally coupled to said driving member and mounted for movement in an orbital path about the axis of said driving member, means for selectively maintaining said planetary member in any of a plurality of preselected positions on said path, and a corresponding plurality of utilization means each rotationally coupled to said planetary member when said planetary member is in a corresponding one of said positions, said driving member and said planetary member being axially movable as a unit between first and second axial locations whereby said planetary member is couplable with said utilization means when in said second location, but not when in said first location, means for selectively supplying rotational driving force to said driving member, first biasing means for biasing said unit toward said first location when said driving force is not being supplied, second biasing means for biasing said unit toward said second location when said driving force is being supplied, obstruction means having an operative position wherein said unit is precluded from moving into said second location and an inoperative position wherein said unit is free to move into said second location in response to the action of said second biasing means, and a plurality of selectively and severally operable actuating means for moving said obstruction means from said operative position to said inoperative position.

7. In combination, a rotational driving member, carrier means mounted on said driving member for axial movement therewith between first and second axial locations and frictionally coupled thereto for limited rotation therewith, a planetary member rotationally coupled to said driving member and mounted on said carrier means for movement in an orbital path about the axis of said driving member, lever means mounted on said carrier means for rotation in a plane substantially perpendicular to said axis about a fulcrum spaced from said axis, latch means protruding from said lever means parallel to said axis and equidistant therewith from said fulcrum, resilient means biasing said latch means out of axial alignment with said axis, first biasing means for biasing said driving member toward said first location when said driving member is driving, second biasing means for biasing said driving member toward said second location when said driving member is not driving, latch receiving means parallelly disposed to said plane of lever rotation for restriction of said axial movement toward said second location by engagement with said latch means when said latch means is out of said alignment, said receiving means having an opening therein for receiving said latch means when said latch means is in said alignment whereby said axial movement toward said second location may occur in response to the action of said second biasing means, a plurality of latch release means adapted to severally and selectively engage an end of said lever means whereby subsequent rotation of said carrier means causes said lever means to rotate about said fulcrum against the bias of said resilient means and carry said latch means into said axial alignment, said planetary member being thereby maintained in one of a plurality of preselected positions along said orbital path, and a plurality of utilization means disposed in a common plane each engageable with said planetary member when said driving member is in said second location, but not when in said first location, one of said utilization means being rotationally coupled to said planetary member when said planetary member is in said one position.

8. The combination set forth in claim 7 wherein said one position of said planetary member corresponds to the engagement of a first one of said latch release means with said lever means, and wherein the engagement of a second one of said latch release means with said lever means causes said planetary member to be maintained in a second preselected position along said orbital path, a second one of said utilization means being rotationally coupled to said planetary member when said planetary member is in said second position.

9. In combination, means rotatable about a first axis and movable therealong between first and second axial locations, latch carrier means mounted on said rotatable means and pivotable about a second axis parallel to said first axis, latch means mounted on said carrier means equidistant with said first axis from said second axis, said carrier means being pivotable between a first position wherein said latch means is spaced from said first axis and a second position wherein said latch means is aligned with said first axis, means for biasing said rotatable means toward said first location during a first interval and toward said second location during a second interval, and latch cooperating means for engaging said latch means in said first position during said second interval thereby preventing movement of said rotatable means into said second location, said cooperating means being provided with a latch receiving area aligned with said first axis whereby said rotatable means is free to move into said second location during said second interval when said carrier means is pivoted into said second position.

10. In combination, means rotatable about a first axis and movable therealong between first and second axial locations, latch carrier means mounted on said rotatable means and pivotable about a second axis parallel to said first axis, latch means mounted on said carrier means equidistant with said first axis from said second axis, said carrier means being pivotable between a first position wherein said latch means is spaced from said first axis and a second position wherein said latch means is aligned with said first axis, means for biasing said rotatable means toward said first location during a first interval and toward said second location during a second interval, latch cooperating means for engaging said latch means in said first position during said second interval thereby preventing movement of said rotatable means into said second location, said cooperating means being provided with a latch receiving area aligned with said first axis whereby said rotatable means is free to move into said second location during said second interval when said carrier means is pivoted into said second position, interrupter means engageable with said carrier means during rotation of said rotatable means for pivoting said carrier means into said second position and for cooperating with said latch means in said second location to maintain said rotatable means in a given stationary angle of rotation, and utilization means engageable with said rotatable means when said rotatable means is in said second location at said given angle.

References Cited in the file of this patent

UNITED STATES PATENTS

| | | |
|---|---|---|
| 1,591,417 | Flocco | July 6, 1926 |
| 2,189,558 | Baxter | Feb. 6, 1940 |
| 2,572,965 | Akermann | Oct. 30, 1951 |
| 2,681,035 | Browne et al. | June 15, 1954 |
| 2,828,648 | Hazard | Apr. 1, 1958 |